United States Patent
Wakatsuki

[11] Patent Number: 5,620,171
[45] Date of Patent: Apr. 15, 1997

[54] SPRING SHEET STRUCTURE

[75] Inventor: Hideaki Wakatsuki, Toyota, Japan

[73] Assignee: Toyota Jidosha Kabushiki Kaisha, Toyota, Japan

[21] Appl. No.: 532,276

[22] Filed: Sep. 22, 1995

[30] Foreign Application Priority Data

Oct. 5, 1994 [JP] Japan .................................. 6-241669

[51] Int. Cl.$^6$ ...................................................... F16F 1/12
[52] U.S. Cl. ........................... 267/179; 267/221; 280/668
[58] Field of Search ............................... 267/33, 34, 155, 267/166, 170, 179, 221, 286; 280/668; 248/578, 618, 623

[56] References Cited

U.S. PATENT DOCUMENTS

| | | | |
|---|---|---|---|
| 2,655,370 | 10/1953 | Schulze | 267/170 |
| 4,362,294 | 12/1982 | Schobbe et al. | 267/170 |
| 4,562,997 | 1/1986 | Iwata et al. | 267/170 |
| 4,712,778 | 12/1987 | Newman | 267/179 |

FOREIGN PATENT DOCUMENTS

| | | |
|---|---|---|
| 55-78515 | 11/1978 | Japan . |
| 57-65107 | 10/1980 | Japan . |
| 59-144241 | 9/1984 | Japan . |
| 86-11425 | 8/1986 | Japan . |
| 1106647 | 7/1989 | Japan . |

OTHER PUBLICATIONS

Japanese Patent Information Organization, vol. 9–32 No. 84–008491, Jul. 1984 (see Appln. Pg. 2).

*Primary Examiner*—Robert J. Oberleitner
*Assistant Examiner*—Chris Schwartz
*Attorney, Agent, or Firm*—Cushman, Darby & Cushman IP group of Pillsbury Madison of Sutro LLP

[57] ABSTRACT

A spring sheet structure is disclosed which enables the prevention of generation of abnormal sound between a coil spring and a spring sheet. A positioning portion is formed at two regions at predetermined positions of a lower spring sheet. The positioning portion is formed by a first curved surface portion whose radius of curvature is slightly less than a radius of a minimum wire diameter coil spring, and a second curved surface portion whose radius of curvature is slightly greater than a radius of a maximum wire diameter coil spring. Further, an outer diameter dimension E of a base portion is set to be less than inner diameter dimensions F, F' of the coil spring. A wound seat portion of the coil spring can be reliably positioned in a point-contacting state, and generation of abnormal sound can be prevented.

20 Claims, 6 Drawing Sheets

SPRING SHEET STRUCTURE

BACKGROUND OF THE INVENTION

1. Field of the Invention

The present invention relates to a spring sheet structure which supports a coil spring used as a suspension spring.

2. Description of the Prior Art

Conventionally, coil springs have often been used as suspension springs for vehicles. The region at which this type of coil spring is disposed differs in accordance with the type of suspension. There are cases in which the coil spring is disposed separate from and independently of the shock absorber, and there are cases in which the coil spring is wound around the outer periphery of the shock absorber. Hereinafter, the latter case will be described.

A lower spring sheet is disposed at the outer peripheral portion of the cylinder of the shock absorber, and an upper spring sheet is disposed at the upper end portion of the piston rod of the shock absorber so as to oppose the lower spring sheet. A coil spring is provided between the upper spring sheet and the lower spring sheet such that the coil spring is wound around the outer peripheral portion of the shock absorber.

In this type of structure, as the coil spring extends and contracts, the end portions of the coil spring move relatively in the radial direction thereof. Due to this movement, abnormal sound is generated between the coil spring and the spring sheets, and consequently, various abnormal sound preventing measures have been taken in the conventional art. Due to the way in which the shock absorber swings, the abnormal sound is generated primarily at the lower spring sheet side, and is generated in a vicinity of a ¾ wound portion which is the starting point at which the coil spring begins to rise spirally from the wound seat portion of the coil spring.

Hereinafter, the abnormal sound preventing structure disclosed in Japan Patent Information Organization Laid-Open No. 84-8491 will be explained. In the structure illustrated in FIG. 5, an annular concave groove 106 is formed at a predetermined position of the outer peripheral portion of a lower spring plate 104 which is welded to the outer peripheral portion of a cylinder 102 of a shock absorber 100. The lower end portion of a coil spring 108 is inserted into and engaged with the concave groove 106. Correspondingly, the annular concave groove 106 is also formed at a predetermined position of the outer peripheral portion of an upper spring sheet 110. The upper end portion of the coil spring 108 is inserted into and engaged with the concave groove 106. In accordance with this structure, the lower end portion of the coil spring 108 is held in a plane-contacting state by an inner wall 106A and an outer wall 106B of the concave groove 106. Therefore, relative radial direction movement of the lower end portion of the coil spring 108, which movement accompanies the extension and contraction of the coil spring 108, can be regulated to a certain extent.

However, in this structure, as illustrated in FIG. 6, the inner wall 106A and the outer wall 106B of the concave groove 106 have an open cross-sectional configuration in which the inner wall 106A and the outer wall 106B both open outwardly. Therefore, when the lower end portion of the coil spring 108 attempts to move in the radial direction in accordance with the extension and contraction, the lower end portion moves in the directions of the arrows in FIG. 6. Specifically, due to the lower end portion attempting to move in the radial direction in accordance with the extension and contraction of the coil spring 108, the lower end portion of the coil spring 108 slides in directions of substantially extending and contracting on the inner wall 106A and the outer wall 106B of the concave groove 106 due to the vertical component at that time. In this case, because the lower end portion of the coil spring 108 plane-contacts the inner peripheral surfaces of the inner wall 106A and the outer wall 106B of the concave groove 106, a sliding sound which accompanies movement in the directions of substantially extending and contracting becomes a relatively loud abnormal sound. Accordingly, there is room for improvement of this structure as an abnormal sound preventing structure.

The structure illustrated in FIG. 7 is a variant example disclosed in the aforementioned laid-open. Pawls 114 are formed at equal intervals by cutting the outer peripheral portion of a lower spring sheet 112 at predetermined positions. The lower end portion of a coil spring 116 is interposed and held between the pawls 114 and a lower wall 112A and a peripheral wall portion 112B of the lower spring sheet 112. Correspondingly, a plurality of the pawls 114 are formed at predetermined positions of the outer peripheral portion of an upper spring sheet 118. The upper end portion of the coil spring 116 is interposed and held between the pawls 114 and a bottom wall 118A and a peripheral wall portion 118B of the upper spring sheet 118. In accordance with this structure as well, in the same way as in the previously-described structure, radial direction movement of the lower end portion of the coil spring 116 can be regulated to a certain extent by the pawls 114 and by the bottom wall 112A and the peripheral wall portion 112B of the lower spring sheet 112.

However, in this structure as well, the pawl 114 formed at the upper left side in the drawing corresponds to a vicinity of the ¾ wound portion of the coil spring 116. As the coil spring 116 extends and contracts, the lower end portion thereof attempts to move in the radial direction. The lower end portion thereby slides on the pawls 114 and the peripheral wall portions 112B in directions of substantially extending and contracting. Accordingly, abnormal sound is generated in the same way as in the previously-described structure.

Further, in both of these structures, in cases in which there is dispersion in coil springs, positioning cannot be effected appropriately, and the aforementioned abnormal sound is generated. Specifically, the wire diameter and the spring diameter of the coil spring are set differently for each vehicle type, and reliably positioning coil springs for all settings is not possible with the above structures. Further, even in cases in which coil springs of the same setting are used, a slight dispersion is caused due to manufacturing errors (tolerances). Therefore, in such cases as well, appropriate positioning of coil springs is not possible with the above-described structures.

SUMMARY OF THE INVENTION

In view of the aforementioned, an object of the present invention is to provide a spring sheet structure in which generation of abnormal sound between a coil spring and a spring sheet can be prevented even if there are differences in wire diameters and spring diameters due to the setting of the coil springs or due to manufacturing errors (tolerances).

The present invention is a spring sheet structure supporting a coil spring used as a suspension spring. The spring sheet structure is formed by a flange portion, an end portion of a coil spring abutting and engaging the flange portion; and by a swelled portion provided at the flange portion, an outer diameter dimension of the swelled portion being set smaller than an inner diameter dimension of the coil spring, the end portion of the coil spring being disposed at an outer side of the swelled portion. The feature of the spring sheet structure is a positioning means provided at two peripheral direction regions of the flange portion which two regions abut and engage the wound seat portion of the coil spring, the positioning means having different radii of curvature at a portion of the positioning means which faces an outer peripheral surface side of a wound seat portion of the coil spring and at a portion of the positioning means which faces an inner peripheral surface side of the wound seat portion of the coil spring, and the positioning means abutting the outer peripheral surface side of the wound seat portion in a point-contact state so as to make the inner peripheral surface side of the wound seat portion abut the swelled portion in a point-contact state.

In accordance with the present invention, an end portion of the coil spring abuts and engages the flange portion of the spring sheet. Further, the wound seat portion at the end portion of the coil spring is positioned by the positioning means provided at two peripheral direction regions of the flange portion.

More specifically, the positioning means of the present invention has different radii of curvature at a portion of the positioning means which faces an outer peripheral surface side of the wound seat portion of the coil spring and at a portion of the positioning means which faces an inner peripheral surface side of the wound seat portion of the coil spring. The positioning means itself thereby abuts the outer peripheral surface side of the wound seat portion of the coil spring in a point-contacting state, and makes the inner peripheral surface side of the wound seat portion of the coil spring abut the swelled portion in a point-contacting state. As a result, the wound seat portion of the coil spring abuts the spring sheet at at least two points (i.e., one point at the wound seat portion inner peripheral surface side and one point at the wound seat portion outer peripheral surface side), at each of two peripheral direction regions of the flange portion. The radial direction positioning of the coil spring with respect to the spring sheet is thereby carried out. As a result, even if the end portion of the coil spring moves in the radial direction as the coil spring extends and contracts, the coil spring does not move in the radial direction at the regions at which the positioning means are provided. Accordingly, there is no movement in directions of extending and contracting due to radial direction movement of the end portion of the coil spring, and abnormal sound is not generated. In particular, in the present invention, the radii of curvature are different at a portion of the positioning means which faces the outer peripheral surface side of the wound seat portion of the coil spring and at a portion of the positioning means which faces the inner peripheral surface side of the wound seat portion of the coil spring. Therefore, even if there is dispersion in spring diameters or in wire diameters due to settings of coil springs in accordance with vehicle types or due to errors (tolerances) in the manufacturing of coil springs, positioning can be effected reliably, and generation of abnormal sound can be prevented.

The outer diameter dimension of the swelled portion is set to be smaller than the inner diameter dimension of the coil spring. Further, as described above, the inner peripheral surface side of the wound seat portion of the coil spring abuts the swelled portion in a point-contacting state due to the positioning means. Therefore, at regions other than the regions at which the positioning means are provided, the swelled portion and the inner peripheral surface of the end portion of the coil spring do not contact. Specifically, a predetermined gap is formed between the swelled portion and the inner peripheral surface of the end portion of the coil spring, so that they are maintained in a non-contacting state. Accordingly, the rising portion which rises spirally from the wound seat portion of the coil spring is also set apart from the swelled portion of the spring sheet and does not contact the swelled portion. As a result, at the rising portion, a gap is formed between the rising portion and the swelled portion of the spring sheet, even if radial direction movement of the end portion accompanying extension and contraction of the coil spring is generated. Therefore, the gap merely becomes more narrow. Accordingly, the end portion of the coil spring does not abut the swelled portion of the spring sheet, and the coil spring does not slide (move in directions of extension and contraction) on the swelled portion. Accordingly, abnormal noise which is caused by such phenomena is not generated.

In this case, the positioning means may include a first curved surface portion and a second curved surface portion, the first curved surface portion being continuous with a bottom portion of the swelled portion and formed at a portion of the positioning means which faces the inner peripheral surface side of the wound seat portion of the coil spring, a radius of curvature of the first curved surface portion being a predetermined dimension less than ½ of a wire diameter of a minimum diameter dimension coil spring, and the second curved surface portion being formed at an outer side of the first curved surface portion and at a portion of the positioning means which faces the outer peripheral surface side of the wound seat portion of the coil spring, a radius of curvature of the second curved surface portion being a predetermined dimension greater than ½ of a wire diameter of a maximum diameter dimension coil spring. In accordance with this structure, the positioning means is formed by the first curved surface portion which is connected to the bottom portion of the swelled portion and which is formed at a portion of the positioning means facing the inner peripheral surface of the wound seat portion of the coil spring, and by the second curved surface portion which is formed at the outer side of the first curved surface portion and at a portion of the positioning means facing the outer peripheral surface side of the wound seat portion of the coil spring. The radius of curvature of the first curved surface portion is set to be a predetermined dimension less than ½ of a wire diameter of a minimum diameter coil spring, and the radius of curvature of the second curved surface portion is set to be a predetermined dimension greater than ½ of a wire diameter of a maximum diameter coil spring. Therefore, positioning can be effected even more reliably and generation of abnormal sound can be prevented even if there is dispersion in spring diameters or wire diameters due to settings of coil springs in accordance with vehicle types or due to errors in manufacturing (tolerances). Further, in this case, the second curved portion may be formed at an outer side of the first curved surface portion and at the portion of the positioning means facing the outer peripheral surface side of the wound seat portion of the coil spring, and may be formed by a base portion whose radius of curvature is a predetermined dimension greater than ½ of the wire diameter of the coil spring, and by a pair of leg portions formed integrally with the base portion at sides thereof and supporting the base portion. In accordance with this structure, because the base portion is supported by the pair of leg portions, an effect is achieved in that there is no deviation in the radius of curvature set at the base portion.

In the present invention, if the outer diameter of the swelled portion at the portion thereof positioned between adjacent positioning means is less than an outer diameter of a general portion of the swelled portion, the portion positioned between adjacent positioning means does not contact the inner peripheral surface of the coil spring. Therefore, the effect of the positioning means on the positioning of the end portion of the coil spring becomes even more reliable.

As described above, the spring sheet structure relating to the present invention is provided with the positioning means which is provided at two peripheral direction regions of the flange portion which two regions abut and engage the wound seat portion of the coil spring, the positioning means having different radii of curvature at a portion of the positioning means which faces an outer peripheral surface side of a wound seat portion of the coil spring and at a portion of the positioning means which faces an inner peripheral surface side of the wound seat portion of the coil spring, and the positioning means abutting the outer peripheral surface side of the wound seat portion in a point-contact state so as to make the inner peripheral surface side of the wound seat portion abut the swelled portion in a point-contact state. Therefore, a superior effect is achieved in that generation of abnormal sound between the coil spring and the spring sheet can be prevented even if there are differences in wire diameters or spring diameters due to setting of the coil springs or manufacturing errors (tolerances).

DETAILED DESCRIPTION OF THE PREFERRED EMBODIMENTS

Figure 1A:
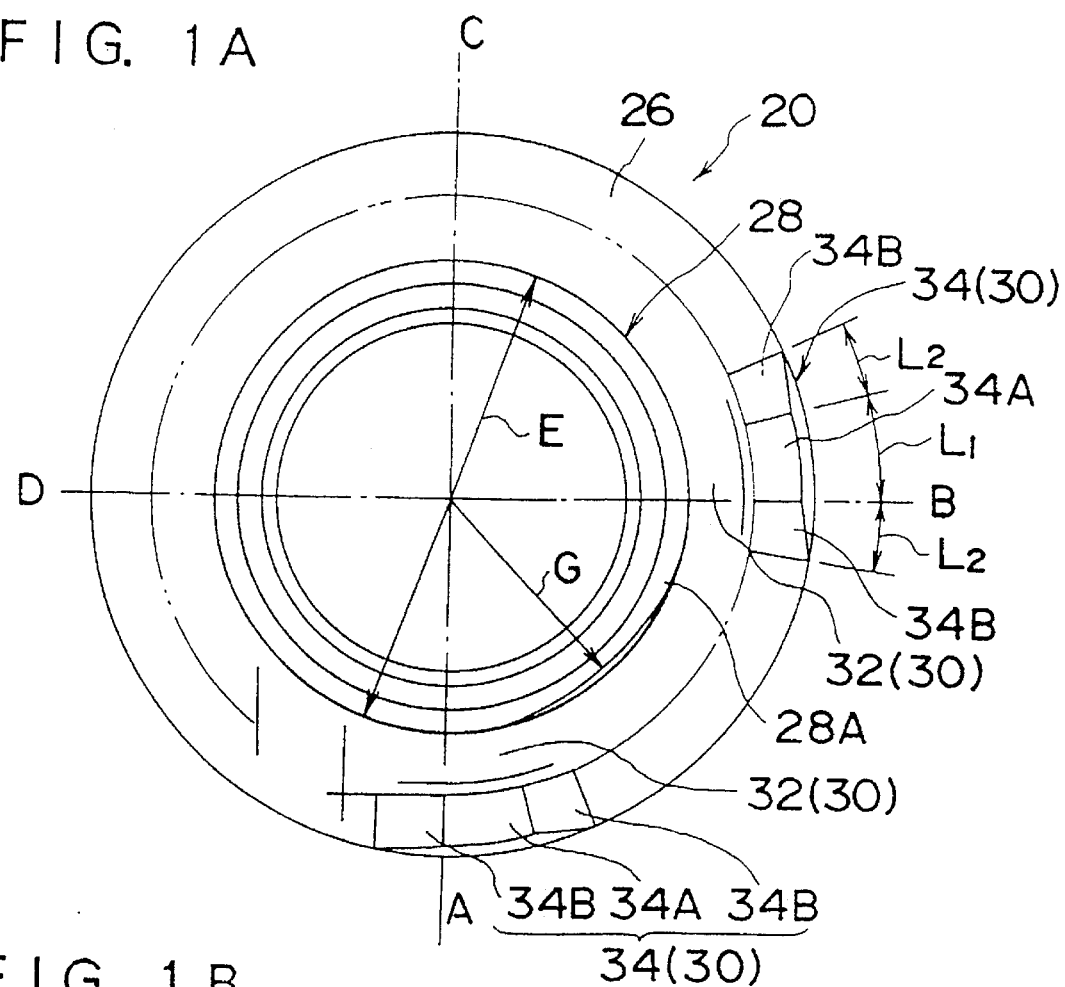
FIG. 1A is a plan view of a lower spring sheet showing a preferred embodiment of a spring sheet structure according to the present invention.

A preferred embodiment of the present invention will be described hereinafter with reference to FIGS. 1 through 4. In FIG. 4, the arrow FR points toward the front of the vehicle, the arrow UP points toward the top of the vehicle, and the arrow IN points toward the interior of the vehicle.

FIG. 4 is an overall perspective view of a Macpherson strut independent suspension type front suspension. As shown in this figure, the front suspension is equipped with a pair of shock absorbers 10 respectively formed from a cylinder and a piston rod. A wheel 14 is attached to the lower end portion of the cylinder of the shock absorber 10 via a bracket 12. The upper end portion of the piston rod of the shock absorber 10 is mounted to the vehicle body via an upper support 18.

A lower spring sheet 20 is welded to the axial direction intermediate portion of the cylinder of the shock absorber 10. An upper spring sheet 22 is mounted to the upper end portion of the piston rod directly beneath the upper support 18. The lower end portion of a coil spring 24 abuts and engages the upper surface of the lower spring sheet 20, whereas the upper end portion of the coil spring 24 abuts and engages the lower surface of the upper spring sheet 22. The coil spring 24 is thereby wound around the outer periphery of the shock absorber 10. Hereinafter, the structure of the lower spring sheet 20 will be described in detail.

Figure 1B:
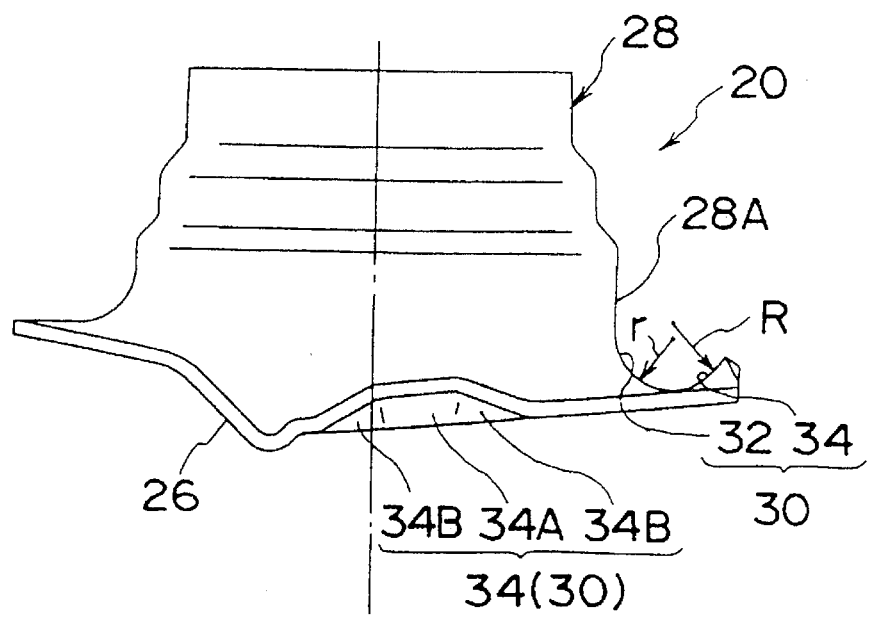
FIG. 1B is a side view of the lower spring sheet illustrated in FIG. 1A.
Figure 2A:
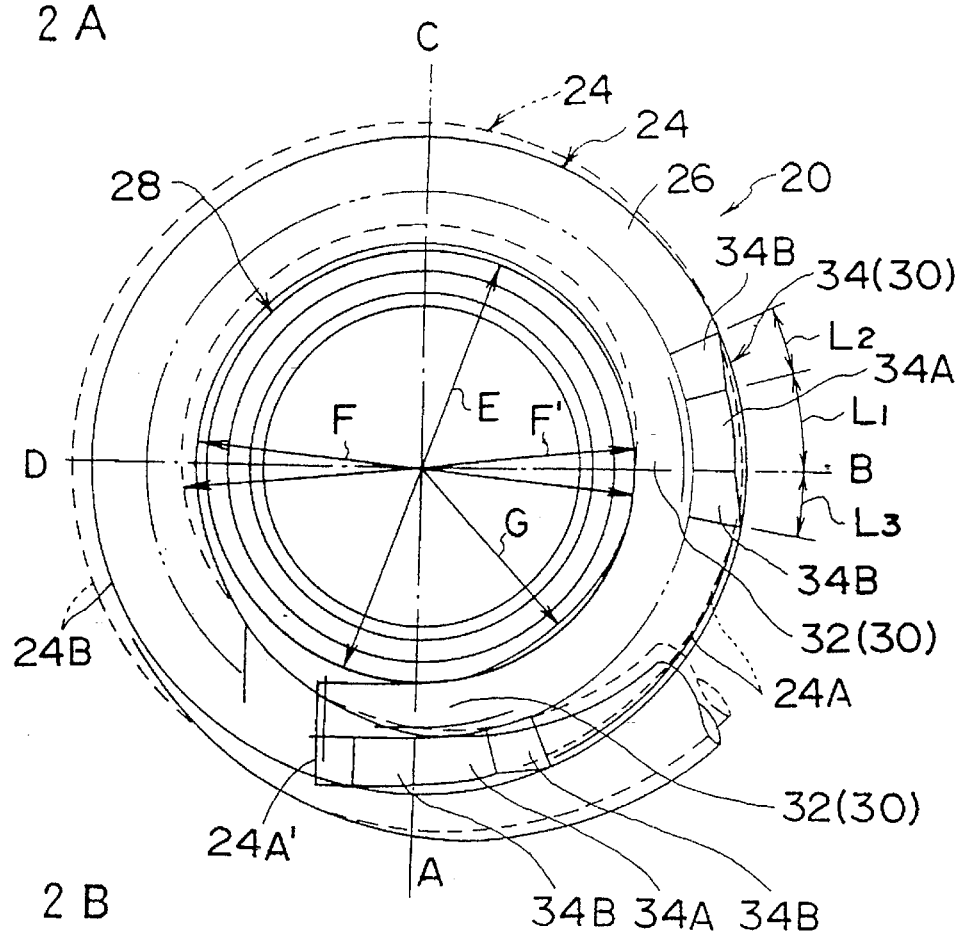
FIG. 2A is a plan view illustrating a state in which a lower end portion of a coil spring abuts and engages the lower spring sheet relating to the embodiment.
Figure 2B:
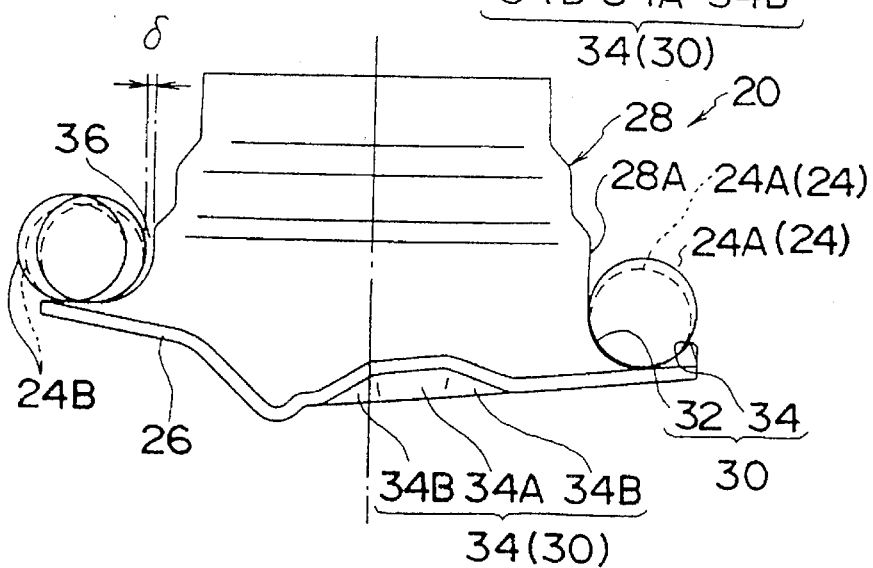
FIG. 2B is a side view of the state illustrated in FIG. 2A.

FIG. 1A is a plan view of the lower spring sheet 20, and FIG. 1B is a side view thereof. FIG. 2A illustrates the assembled states of the minimum wire diameter coil spring 24 (shown by the broken line) and the maximum wire diameter coil spring 24 (shown by the solid line) with a flange portion 26 of the lower spring sheet 20, the assembled states being superposed in the same drawing. FIG. 2B is a side view of FIG. 2A. In these figures, portion A corresponds to a 0/4 wound portion of the coil spring 24, portion B corresponds to a ¼ wound portion of the coil spring 24, portion C corresponds to a 2/4 wound portion of the coil spring 24, and portion D corresponds to a ¾ wound portion of the coil spring 24. Further, an end portion 24A' (starting point) of the wound seat portion 24A of the coil spring 24 is positioned in a vicinity of portion A. In a vicinity of portion D, the wound seat portion 24A changes into a spiral rising portion 24B.

As is illustrated in these figures, the lower spring sheet 20 is formed from a tube-shaped base portion 28, which is formed at an axial core portion, and the plate-shaped flange portion 26, which extends from the lower end portion of the base portion 28 outwardly in the radial direction. The peripheral wall forming the base portion 28 is drawn such that the diameter thereof is reduced in a step-like manner towards the top. The distal end portion of the base portion 28 is welded to the outer peripheral portion of the cylinder of the shock absorber 10. The outer diameter dimension E of the base portion 28 is set to be smaller than the inner diameter dimension F of the maximum wire diameter coil spring 24 (illustrated by the solid line) or smaller than the inner diameter dimension F' of the minimum wire diameter coil spring 24 (illustrated by the broken line). In this way, it is possible to wind the lower end portion of the coil spring 24 around the outer peripheral portion of the base portion 28 of the lower spring sheet 20, so that the lower end portion of the coil spring 24 abuts and engages the flange portion 26.

Positioning portions 30 of predetermined configurations are formed integrally with the flange portion 26 at predetermined peripheral direction regions thereof. More specifically, the positioning portions 30 are formed at the flange portion 26 at two regions, i.e., portion A and portion B in the peripheral direction. The range from portion A through portion C is a range in which the coil spring 24 always contacts the lower spring sheet 20 even if the coil spring 24 extends and contracts. The outer periphery radius G of the base portion 28 at the range from portion A through portion B is set to be slightly smaller than ½ of the outer diameter dimension E of the base portion 28. The significance of this structure will be explained later.

As illustrated in FIG. 1B, the positioning portion 30 is formed of a first curved surface portion 32 and a second curved surface portion 34. The first curved surface portion 32 is connected to a lower portion peripheral wall 28A of the base portion 28 and is set to a predetermined radius of curvature r. The second curved surface portion 34 is connected to the outer side of the first curved surface portion 32 and is set to a predetermined radius of curvature R. The second curved surface portion 34 is formed by the flange portion 26 swelling in a substantially trapezoidal shape from the outer peripheral portion rear surface side thereof toward the base portion 28 side. Accordingly, the second curved surface portion 34 has three surfaces formed from a central portion 34A (peripheral direction dimension $L_1$) and side portions 34B thereof (respectively having a peripheral direction dimension $L_2$). The central portion 34A is set to the predetermined radius of curvature R. This is so as little of a concentration of stress as possible is generated at the coil spring 24.

Figure 3:
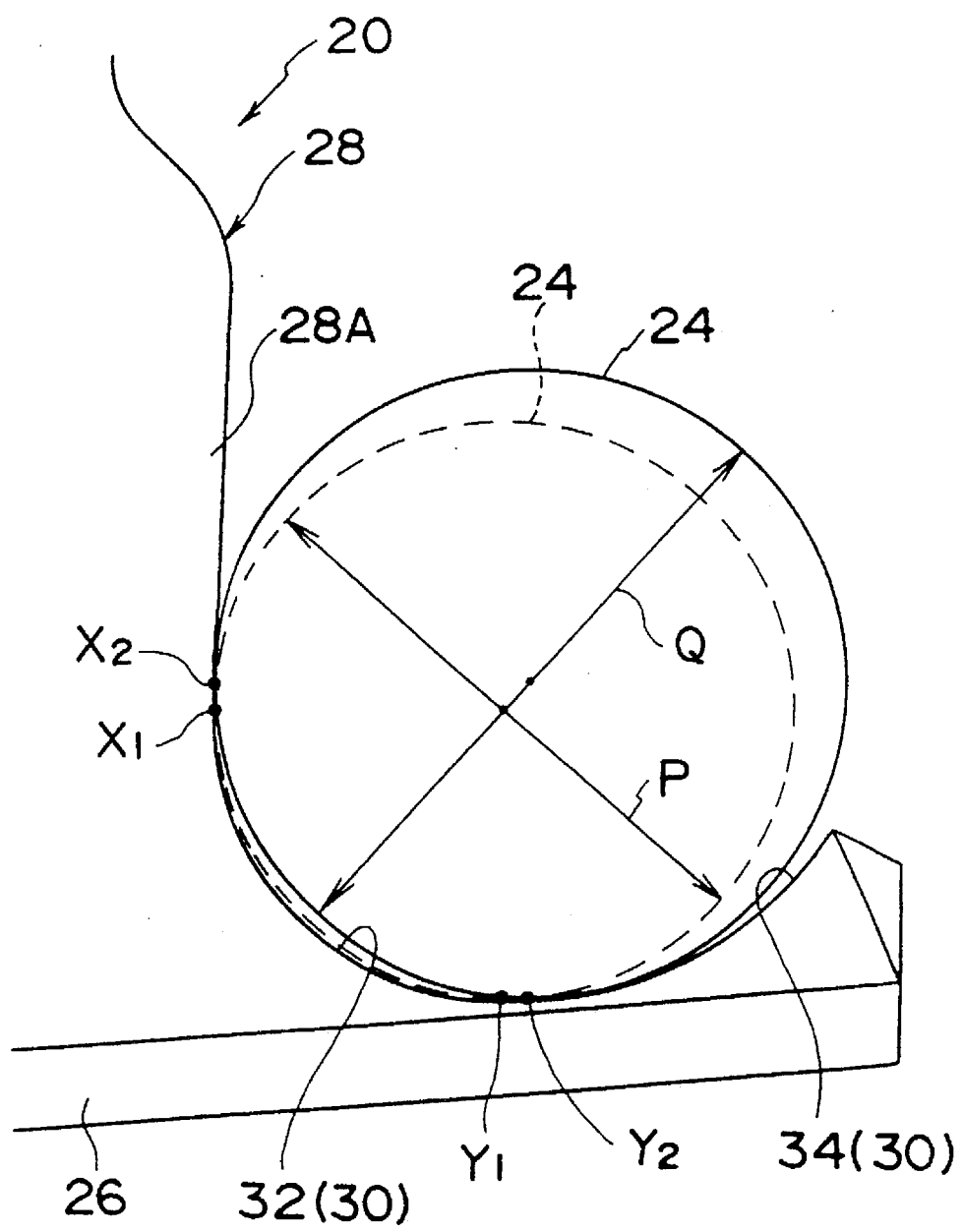
FIG. 3 is an enlarged view of a positioning portion illustrated in FIG. 2B.
Figure 4:
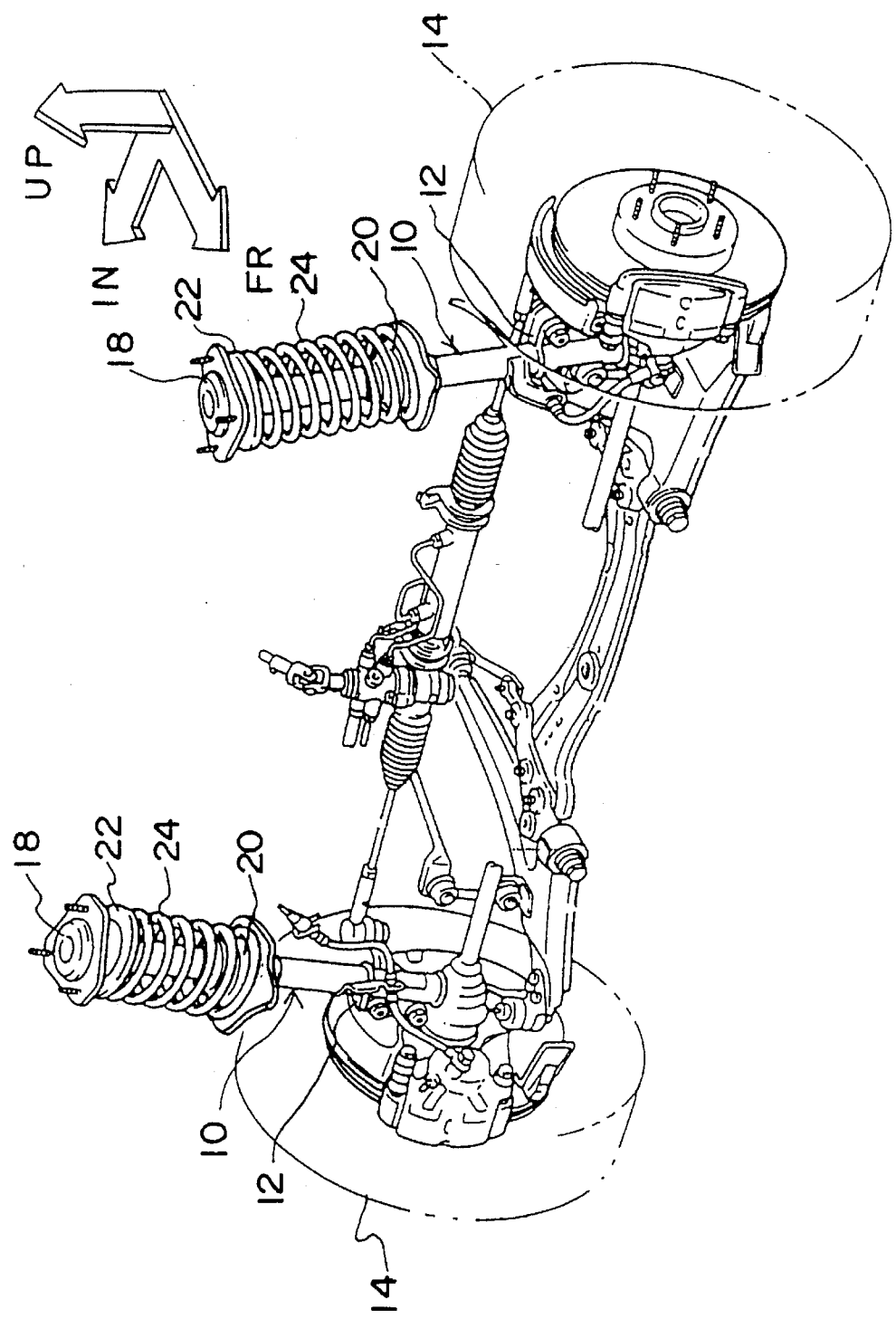
FIG. 4 is an overall perspective view of a front suspension equipped with the lower spring sheet relating to the embodiment.

As illustrated in the expanded view of FIG. 3, the radius of curvature r of the first curved surface portion 32 is set to be slightly smaller than ½ of the wire diameter P of the coil spring 24 of the minimum wire diameter which can be used (shown by the broken line). The range at which the first curved portions 32 are formed is a range of substantially 90 degrees in the figure (the third quadrant). The radius of curvature R of the second curved surface portion 34 is set to be slightly larger than ½ of the wire diameter Q of the coil spring 24 of the maximum wire diameter which can be used (shown by the solid line). Here, "maximum wire diameter" refers to the wire diameter in a case in which the wire diameter of the coil spring 24 is at a maximum and the manufacturing error (tolerance) is also at a maximum. Conversely, "minimum wire diameter" refers to the wire diameter in a case in which the wire diameter of the coil spring 24 is at a minimum and the manufacturing error (tolerance) is also at a minimum.

Hereinafter, operation of the present embodiment will be described.

As described above, when the lower end portion of the minimum wire diameter coil spring 24 illustrated by the broken line abuts and engages the lower spring sheet 20, the radius of curvature r of the first curved surface portion 32 is set to slightly less than ½ of the wire diameter P of the minimum wire diameter coil spring 24 (see FIG. 3). As a result, the inner peripheral surface of the lower end portion of the coil spring 24 (the wound seat portion 24A) point-contacts a point $X_1$ of the lower portion peripheral wall 28A of the base portion 28 (point $X_1$ is the boundary between the lower portion peripheral wall 28A and the first curved surface portion 32). Further, the outer peripheral surface of the lower end portion of the coil spring 24 (the wound seat portion 24A) point-contacts a point $Y_1$ which is the starting point of the second curved surface portion 34 (point $Y_1$ is the boundary between the first curved surface portion 32 and the second curved surface portion 34). Points $X_1$ and $Y_1$ are separated by substantially 90 degrees. Accordingly, the inner peripheral surface side and the outer peripheral surface side of the wound seat portion 24A of the coil spring 24 point-contact at two points which do not oppose each other, and the wound seat portion 24A is positioned with respect to the radial direction.

When the coil spring 24 extends and contracts in this state, at portion A and portion B at which the positioning portions 30 are provided, the wound seat portion 24A of the coil spring 24 is in a state of being positioned in the radial direction by the first curved surface portion 32 and the second curved surface portion 34 of the positioning portions 30. Therefore, the wound seat portion 24A does not move in the radial direction.

In the vicinity of portion D at which the wound seat portion 24A changes into the rising portion 24B, the inner diameter dimension F' of the coil spring 24 is set to be greater than the outer diameter dimension E of the base portion 28. Therefore, in the assembled state, the inner peripheral surface of the coil spring 24 is separated from the lower portion peripheral wall 28A. Specifically, a predetermined gap 36 (see FIG. 2B) is formed between the inner peripheral surface of the coil spring 24 and the lower portion peripheral wall 28A. In this state, when the coil spring 24 extends and contracts, the coil spring 24 moves outwardly in the radial direction when compressed, and moves inwardly in the radial direction when extended. In the conventional art, due to this movement, the coil spring 24 abuts the base portion 28 and slides further in the directions of extension and contraction such that abnormal noise is generated. However, in the present embodiment, as described above, the predetermined gap 36 is formed between the base portion 28 and the inner peripheral surface of the lower end portion of the coil spring 24. Therefore, during extension, even if the lower end portion of the coil spring 24 moves inwardly in the radial direction, the gap 36 of a dimension δ still remains. As a result, in accordance with the present embodiment, abnormal sound is not generated at this region.

For example, even if the lower end portion of the maximum wire diameter coil spring 24 illustrated by the solid line abuts and engages the lower spring sheet 20, the same operation as that described above is achieved. Hereinafter, this operation will briefly be explained. In this case, because the wire diameter Q of the coil spring 24 is the maximum wire diameter, as illustrated in FIG. 3, the inner peripheral surface of the lower end portion of the coil spring 24 (the wound seat portion 24A) point-contacts the lower end peripheral wall 28A of the base portion 28 at a point $X_2$ which is slightly above the point $X_1$. Further, the outer peripheral surface of the lower end portion of the coil spring 24 (the wound seat portion 24A) point-contacts the second curved surface portion 34 at a point $Y_2$ which is slightly at the outer side of the point $Y_1$. The points $X_2$ and $Y_2$ are separated by a little over 90 degrees. Accordingly, the inner peripheral surface side and the outer peripheral surface side of the wound seat portion 24A of the coil spring 24 point-contact at two points which do not oppose each other, and the wound seat portion 24A is positioned in the radial direction. In this state, even if the coil spring 24 extends or contracts, at the portions A and B at which the positioning portions 30 are provided, the wound seat portion 24A of the coil spring 24 is in a state of being positioned in the radial direction. Therefore, the wound seat portion 24A does not move in the radial direction. Further, even at portion D, the inner peripheral surface of the coil spring 24 does not contact the base portion 28 (see FIG. 2B) for the same reasons as in the previously-described case.

In the present embodiment, the positioning portions 30, which are respectively formed by the first curved surface portion 32 and the second curved surface portion 34, are provided at two peripheral direction regions of the flange portion 26 which regions abut and engage the wound seat portion 24A of the coil spring 24. Therefore, the positioning of the wound seat portion 24A of the coil spring 24 is effected reliably, and movement of the wound seat portion 24A in the radial direction can be prevented. In particular, because the respective radii of curvature of the first curved surface portion 32 and the second curved surface portion 34 are different, even if there is dispersion in wire diameters or coil diameters of coil springs 24 due to differences in vehicle types or manufacturing errors (tolerances), positioning of the wound seat portion 24A of the coil spring 24 can be carried out reliably. In this way, at portion D at which abnormal sound is generated easily, the inner peripheral surface of the lower end portion of the coil spring 24 can always be set apart from the base portion 28. Accordingly, even if radial direction movement of the wound seat portion 24A accompanying the extension and contraction of the coil spring 24 is generated in a vicinity of portion D, generation of abnormal sound due to the wound seat portion 24A abutting the lower portion peripheral wall 28A of the base portion 28 or due to the wound seat portion 24A sliding on the lower portion peripheral wall 28A of the base portion 28 can be prevented.

In the present embodiment, the radius of curvature r of the first curved surface portion 32 of the positioning portion 30 is set to slightly less than ½ of the wire diameter of the minimum wire diameter coil spring 24, and the radius of curvature R of the second curved surface portion 34 is set to slightly more than ½ of the wire diameter of the maximum wire diameter coil spring 24. Therefore, the inner peripheral surface of the wound seat portion 24A of the coil spring 24 can reliably be made to point-contact the lower portion peripheral wall 28A (including the boundary portion with the first curved surface portion 32) of the base portion 28. Further, the outer peripheral surface of the wound seat portion 24A can reliably be made to point-contact the second curved surface portion 34 (including the boundary portion with the first curved surface portion 32). Accordingly, the effect described above that "even if there is dispersion in wire diameters or coil diameters of coil springs 24 due to differences in vehicle types or manufacturing errors (tolerances), positioning of the wound seat portion 24A of the coil spring 24 can be carried out reliably" can be made even more reliable.

Further, in accordance with the present embodiment, the radius G of the base portion 28 of the lower spring sheet 20 over the range from portion A to portion B is set to be slightly less than ½ of the outer diameter dimension E of the base portion 28. Therefore, at this region, the inner peripheral surface of the wound seat portion 24A of the coil spring 24 does not contact the lower portion peripheral wall 28A of the base portion 28. As a result, positioning of the wound seat portion 24A of the coil spring 24 is effected only at the positioning portions 30 provided at portion A and portion B. Accordingly, at these points as well, positioning of the wound seat portion 24A of the coil spring 24 becomes even more reliable.

Conventional structures include a structure in which a resin insulator is placed at the flange portion of the lower spring sheet in order to prevent abnormal sound, and a structure in which a protector made of urethane or the like is provided separately in order to prevent abnormal sound. However, in accordance with the present embodiment, there is no need for such separate parts, and accordingly, the number of parts does not increase. Further, when these resin parts are used, there is the concern that the parts may be abraded due to movement of the coil spring in the radial direction which accompanies the extension and contraction of the coil spring. However, there is no such drawback in the present embodiment.

In the present embodiment, only either point $X_1$ or point $X_2$, at which the inner peripheral surface of the wound seat portion 24A of the coil spring 24 and the lower portion peripheral wall 28A of the base portion 28 point-contact, receives external force in the radial direction. Further, only either point $Y_1$ or point $Y_2$, at which the outer peripheral surface of the wound seat portion 24A of the coil spring 24 and the second curved surface portion 34 point-contact, receives external force in the directions of extension and contraction. Therefore, even if the wound seat portion 24A were to move in directions of extension and contraction at these regions in accordance with the extension or contraction of the coil spring 24, the sliding point would only be point $X_1$ or point $X_2$. Accordingly, because the sliding would only be at one point, even if abnormal sound were caused by the sliding, the abnormal sound would be extremely low.

In the present embodiment, the present invention is applied to the lower spring sheet 20. However, the present invention is not limited to the same, and may also be applied to the upper spring sheet 24.

Further, in the present embodiment, the present invention is applied to a structure in which the coil spring 24 is wound around the shock absorber 10. However, the present invention is not limited to the same, and may be applied to a structure in which the shock absorber and the coil spring are disposed separately and independently.

Figure 5:
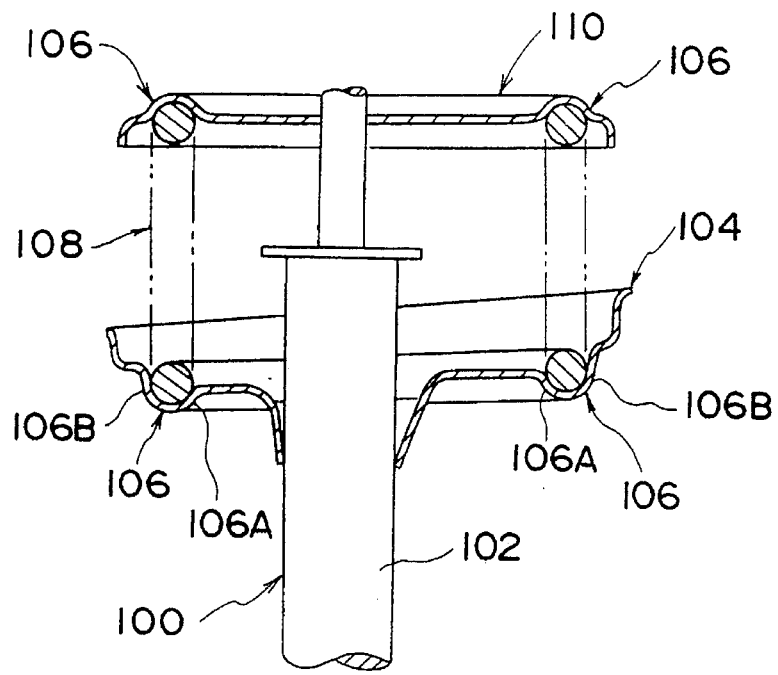
FIG. 5 is a schematic vertical sectional view illustrating a conventional example in which concave portions are provided in spring sheets.
Figure 6:
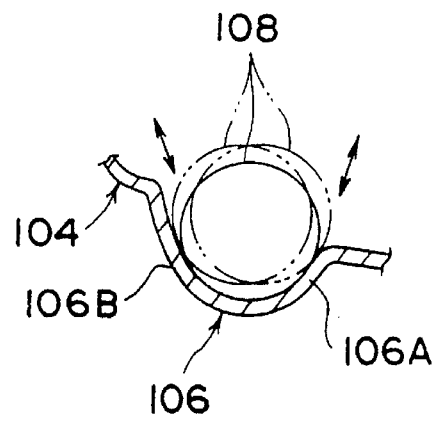
FIG. 6 is an explanatory view for explaining drawbacks of the structure illustrated in FIG. 5.
Figure 7:
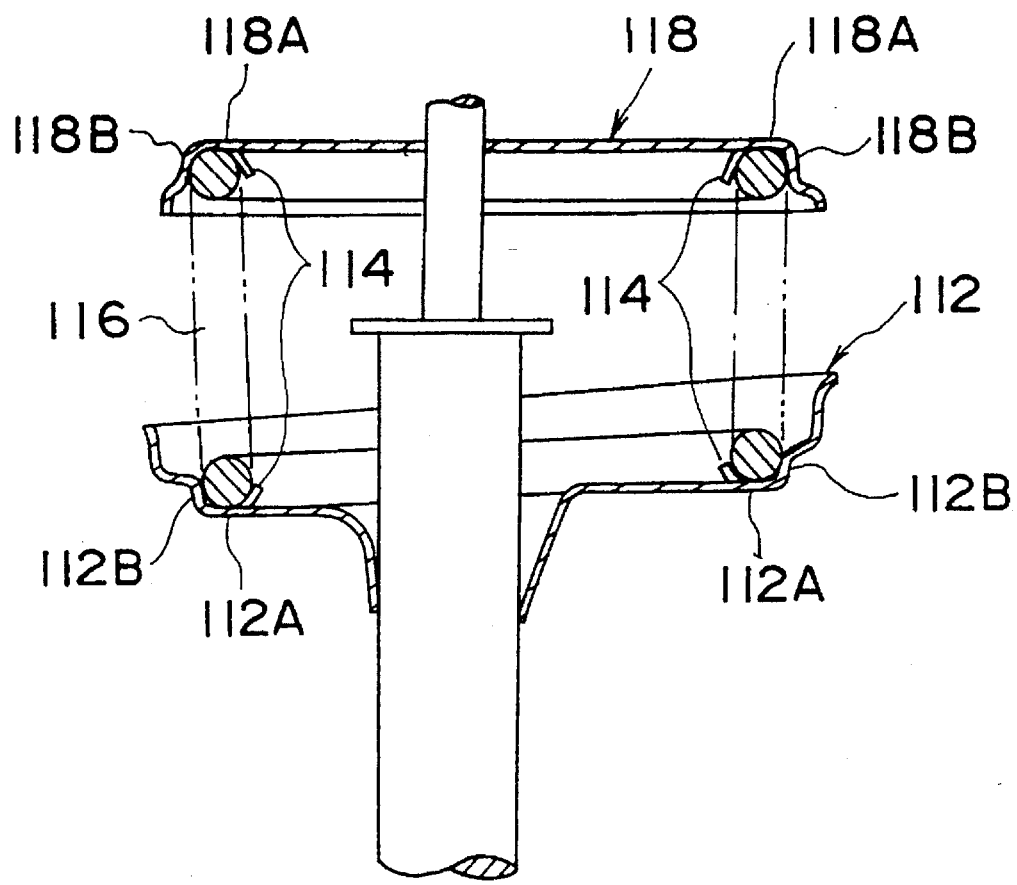
FIG. 7 is a schematic vertical sectional view corresponding to FIG. 5 and illustrating a conventional example in which cut-outs are formed in the spring sheets.

Moreover, in the present embodiment, the present invention is applied to the lower spring sheet 20 which has a hat-shaped cross-sectional configuration. However, the cross-sectional configuration of the spring sheet is not limited to this shape, and the present invention is applicable to all structures having a swelled portion and a flange portion. For example, the structure relating to the present invention can also be applied to a lower spring sheet such as that described previously in the "Description of the Prior Art". In this case, the relationship of the radii of curvature R, r may be set in the same way as in the present embodiment, and the radius (½ of E) of the portion corresponding to the base portion 28 (the concave groove 106 in FIG. 5 corresponds to the base portion 28) may be slightly smaller than ½ of the outer diameter dimensions F, F' of the coil spring 24.

In the present embodiment, the positioning portion 30 formed by the first curved surface portion 32 and the second curved surface portion 34 is used. However, it suffices if a positioning means which includes the first curved surface portion 32 and the second curved surface portion 34 is used. For example, the positioning means may be structured by curved surface portions having three types of radii of curvature, four types of radii of curvature or the like. In this case, the wound seat portion 24A of the coil spring 24 point-contacts the positioning means and the lower portion peripheral wall 28A of the base portion 28 at three points, four points or the like.

Further, in the present embodiment, the second curved surface portion 34 is formed by the outer side of the flange portion 26 being swelled. However, the present invention is not limited to the same, and the outer side of the flange portion 26 may be cut out and the radius of curvature thereof curved to R. However, the structure of the present embodiment in which the flange portion 26 is swelled and the positioning portion 30 is formed integrally therewith is advantageous in so far as no dispersion occurs in the setting of the radius of curvature R because the pair of side portions 30B function as leg portions which support the central portion 30A.

What is claimed is:

1. A spring sheet structure supporting a coil spring used as a suspension spring, comprising:

a flange portion, an end portion of a coil spring abutting and engaging said flange portion;

a swelled portion provided at said flange portion, an outer diameter dimension of said swelled portion being set smaller than an inner diameter dimension of the coil spring, the end portion of the coil spring being disposed at an outer side of said swelled portion; and positioning means provided at two peripheral direction regions of said flange portion which two regions abut and engage a wound seat portion of the end portion of the coil spring, said positioning means having different radii of curvature at a portion of said positioning means which faces an outer peripheral surface side of the wound seat portion of the coil spring and at a portion of said positioning means which faces an inner peripheral surface side of the wound seat portion of the coil spring, and said positioning means abutting the outer peripheral surface side of the wound seat portion in a point-contact state so as to make the inner peripheral surface side of the wound seat portion abut said swelled portion in a point-contact state.

2. A spring sheet structure according to claim 1, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, a radius of curvature of said second curved surface portion being a predetermined dimension greater than ½ of a wire diameter of a maximum diameter dimension coil spring.

3. A spring sheet structure according to claim 2, wherein an outer diameter of said swelled portion at a portion of said swelled portion positioned between said positioning means is less than an outer diameter of a general portion of said swelled portion.

4. A spring sheet structure according to claim 1, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, said second curved surface portion being formed by a base portion whose radius of curvature is a predetermined dimension greater than ½ of the wire diameter of the coil spring, and by a pair of leg portions formed integrally with the base portion at sides thereof and supporting the base portion.

5. A spring sheet structure according to claim 4, wherein an outer diameter of said swelled portion at a portion of said swelled portion positioned between said positioning means is less than an outer diameter of a general portion of said swelled portion.

6. A spring sheet structure according to claim 4, wherein both sides of the pair of leg portions are supported by said flange portion.

7. A spring sheet structure according to claim 1, wherein an outer diameter of said swelled portion at a portion of said swelled portion positioned between said positioning means is less than an outer diameter of a general portion of said swelled portion.

8. A spring sheet structure according to claim 1, wherein said swelled portion is formed integrally with said flange portion by protruding said flange portion.

9. A lower spring sheet structure supporting a coil spring used as a suspension spring, comprising:

a flange portion, a lower end portion of a coil spring abutting and engaging an upper portion of said flange portion;

a swelled portion provided at said flange portion, an outer diameter dimension of said swelled portion being set smaller than an inner diameter dimension of the coil spring, the lower end portion of the coil spring being disposed at an outer side of said swelled portion; and positioning means provided at two peripheral direction regions of said flange portion which two regions abut and engage a wound seat portion of the end portion of the coil spring, said positioning means having different radii of curvature at a portion of said positioning means which faces an outer peripheral surface side of the wound seat portion of the coil spring and at a portion of said positioning means which faces an inner peripheral surface side of the wound seat portion of the coil spring, and said positioning means abutting the outer peripheral surface side of the wound seat portion in a point-contact state so as to mare the inner peripheral surface side of the wound seat portion abut said swelled portion in a point-contact state.

10. A lower spring sheet structure according to claim 9, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, a radius of curvature of said second curved surface portion being a predetermined dimension greater than ½ of a wire diameter of a maximum diameter dimension coil spring.

11. A lower spring sheet structure according to claim 10, wherein an outer diameter of said swelled portion at a portion of said swelled portion positioned between said positioning means is less than an outer diameter of a general portion of said swelled portion.

12. A lower spring sheet structure according to claim 9, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, said second curved surface portion being formed by a base portion whose radius of curvature is a predetermined dimension greater than ½ of the wire diameter of the coil spring, and by a pair of leg portions formed integrally with the base portion at sides thereof and supporting the base portion.

13. A lower spring sheet structure according to claim 12, wherein an outer diameter of said swelled portion at a portion of said swelled portion positioned between said positioning means is less than an outer diameter of a general portion of said swelled portion.

14. A lower spring sheet structure according to claim 9, wherein an outer diameter of said swelled portion at a portion of said swelled portion positioned between said positioning means is less than an outer diameter of a general portion of said swelled portion.

15. A lower spring sheet structure which is substantially hat-shaped and supports a coil spring used as a suspension spring coaxially with a shock absorber, comprising:

a flange portion, a lower end portion of a coil spring abutting and engaging an upper portion of said flange portion;

a swelled portion provided at said flange portion, an outer diameter dimension of said swelled portion being set smaller than an inner diameter dimension of the coil spring, the lower end portion of the coil spring being disposed at an outer side of said swelled portion; and positioning means provided at two peripheral direction regions of said flange portion which two regions abut and engage a wound seat portion of the end portion of the coil spring, said positioning means having different radii of curvature at a portion of said positioning means which faces an outer peripheral surface side of the wound seat portion of the coil spring and at a portion of said positioning means which faces an inner peripheral surface side of the wound seat portion of the coil spring, and said positioning means abutting the outer peripheral surface side of the wound seat portion in a point-contact state so as to make the inner peripheral surface side of the wound seat portion abut said swelled portion in a point-contact state.

16. A lower spring sheet structure according to claim 15, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, a radius of curvature of said second curved surface portion being a predetermined dimension greater than ½ of a wire diameter of a maximum diameter dimension coil spring.

17. A lower spring sheet structure according to claim 16, wherein an outer diameter of said swelled portion at a portion of said swelled portion positioned between said positioning means is less than an outer diameter of a general portion of said swelled portion.

18. A lower spring sheet structure according to claim 15, wherein said positioning means includes a first curved surface portion continuous with a bottom portion of said swelled portion and formed at said portion of said positioning means which faces the inner peripheral surface side of the wound seat portion of the coil spring, a radius of curvature of said first curved surface portion being a predetermined dimension less than ½ of a wire diameter of a minimum diameter dimension coil spring; and a second curved surface portion formed at an outer side of said first curved surface portion and at said portion of said positioning means which faces the outer peripheral surface side of the wound seat portion of the coil spring, said second curved surface portion being formed by a base portion whose radius of curvature is a predetermined dimension greater than ½ of the wire diameter of the coil spring, and by a pair of leg portions formed integrally with the base portion at sides thereof and supporting the base portion.

19. A lower spring sheet structure according to claim 18, wherein an outer diameter of said swelled portion at a portion of said swelled portion positioned between said positioning means is less than an outer diameter of a general portion of said swelled portion.

20. A lower spring sheet structure according to claim 15, wherein an outer diameter of said swelled portion at a portion of said swelled portion positioned between said positioning means is less than an outer diameter of a general portion of said swelled portion.

* * * * *